United States Patent [19]

Knapp

[11] Patent Number: 4,648,744
[45] Date of Patent: Mar. 10, 1987

[54] METHOD AND APPARATUS FOR POSITIONING OPTICAL FIBERS IN A BURIED CONDUIT

[76] Inventor: Kenneth M. Knapp, 1209 Hardy, Houston, Tex. 77020

[21] Appl. No.: 730,281

[22] Filed: May 3, 1985

[51] Int. Cl.⁴ ............................................. F16L 1/02
[52] U.S. Cl. ...................................... 405/154; 138/94; 405/184
[58] Field of Search ............... 254/134.3 FT, 134.3 R; 138/94; 405/154, 156, 184

[56] References Cited

U.S. PATENT DOCUMENTS

| | | | |
|---|---|---|---|
| 4,011,100 | 3/1977 | Ross | 15/104.06 R |
| 4,309,128 | 1/1982 | Williams | 405/156 |
| 4,432,663 | 2/1984 | Lasak et al. | 254/134.3 FT |
| 4,460,159 | 7/1984 | Charlebois et al. | 254/134.3 FT |
| 4,509,222 | 4/1985 | Knapp | 166/153 |

FOREIGN PATENT DOCUMENTS 663781  5/1963  Canada ..................... 254/134.3 FT Primary Examiner—Richard J. Scanlan, Jr.
Assistant Examiner—Kristina I. Hall

[57] ABSTRACT

A method and apparatus for installing optical fibers on a leader in plastic pipe are disclosed. In the preferred and illustrated embodiment for one type of plastic pipe having transverse corrugations, a pig is set forth which has a eyelet for connection with a towed leader, the eyelet being anchored at the nose. The pig body is constructed so that the nose is deformed as loading increases with length of leader, thereby swelling. This reduces blow-by and increases thrust force acting on the pig to overcome the increase in drag with leader length. An alternate embodiment shows an outer layer incorporating graphite or Teflon ® particles in the outer layer to reduce friction. The pigs of this disclosure are adapted to be used in procedures involving corrugated plastic pipe and also plastic pipe having a smooth wall and spaced welded internal beads.

25 Claims, 6 Drawing Figures

METHOD AND APPARATUS FOR POSITIONING OPTICAL FIBERS IN A BURIED CONDUIT

BACKGROUND OF THE DISCLOSURE

This disclosure is directed to a method and apparatus for positioning optical fibers in underground conduits. Optical fiber transmission is adventagous in telephony. It provides clarity of signal transmission and also an extremely wide band width to enable a tremendous reduction in size of telephone cables. Thus, a relatively small optical fiber can replace a large armored telephone conduit of the sort typically supported on telephone poles or alternately, buried underground in specially constructed tile culverts for the conduit. Typically, the conduit encases several hundred, perhaps several thousand pair of conductors, each pair being connected to an individual telephone customer. As will be understood, the conductor pairs do not carry substantial current but they do have to provide a relatively noise free connection for the various customers. Installation and subsequent maintenance over a period of years costs substantial sums for armored conduit cabling. Optical fibers have the advantage of reduced size and greater band pass and hence are replacing the armored conduit cable.

In the past, a typical telephone cable has been buried underground exercizing caution to position the conduit in a tile culvert in some installations, or to otherwise provide a suitable wrapping to prevent such ground water intrusion. Ground water intrusion creates substantial noise. In many instances, it can be kept out of the cable only by continuously maintaining a positive pressure of dry nitrogen in the armored cable. Many advantages thus arise from installing optical fibers for telephony transmission for hundreds, perhaps even thousands of conductor pairs.

Optical fibers can be fabricated substantially without limit to length. However, at the time of installation, they must be carefully spliced, and splicing of an optical fiber typically is a tedious and rather expensive undertaking. Accordingly, it would be adavantageous to install optical fibers in great lengths with fewer splices to reduce the cost of installation. Presently, optical fibers are installed and routed underground by means of a plastic pipe. The plastic pipe has a wall specifically made to prevent accidental puncture and is substantially impervious to the intrusion of underground water. In fact, optical fibers are impervious to underground water. However, there is a problem that arises from the installation procedure. Assume (as an example to set forth one problem) that an underground plastic pipe has a length of 10,000 ft. The present approach utilizes a shuttle device to pull a leader into the plastic pipe. The shuttle device is forced by air into the plastic pipe and will travel some distance. Distances of 1,000 ft. are not uncommon. In fact, the shuttle of the prior art (to be discussed below with regard to FIG. 1) has occasionally achieved more distance and has been reported to sometimes accomplish 1800 ft. This then requires a splice to be made. Leader length in the pipe can be measured quite easily and hence the end of the leader can be determined. This then requires that the plastic pipe be dug up to locate the towing device (known as a birdie). At this point, the splice is made and the birdie then continues further down the pipe. One birdie trip may not fully span the length of the plastic pipe which in this example is 10,000 ft. Assuming that the birdie travels 1500 ft., it may well require interruption of the plastic pipe (with splicing) to fully extend the optical fiber along the 10,000 ft. of plastic pipe. Several such interruptions will be required. If an average travel was 1500 ft., 6 intermediate digging operations would be required to retrieve the birdie and perform the necessary steps prior to launching the birdie. Again each digging operator would be accompanied by a splice.

The apparatus and method of the present disclosure shows a marked improvement in range over the previous birdie system. This improvement enables the optical fiber to be extended over greater distances without interruptions, and hence with a minimum of pipe digging and splicing. Thus splices are avoided, reducing the cost of installation. This apparatus thus enables the leader to be towed through a greater length of plastic pipe when installing the optical fiber system.

Certain advantages in addition to these will be noted on a description of the preferred embodiment and method of using the present apparatus. The present apparatus is thus summarized as an optical fiber leader towing pig having multiple walls and permiting controllable blow-by. The blow-by is quite large when the pig is first introduced into the plastic pipe. As the pig travels through the plastic pipe, the leader which it tows creates drag and provides a retarding force on the pig. The pig is constructed and arranged so that the towing drag or force acting on the pig causes the pig to swell at the forward end and to have an enlarged diameter. As the diameter at the forward end of the pig enlarges, the amount of blow-by is reduced, thereby increasing the propelling force acting on the optical fiber towing pig. This increases the pulling force of the pig thereby increasing the range of travel. An increase in range is reflected as an increase in length of optical fiber leader which can be pulled through the plastic pipe.

BRIEF DESCRIPTION OF THE DRAWINGS

So that the manner in which the above-recited features, advantages and objects of the present invention, as well as others which will become apparent, are attained and can be understood in detail, a more particular description of the invention, briefly summarized above, may be had by reference to the embodiments thereof illustrated in the appended drawings, which drawings form a part of this specification.

It is to be noted, however, that the appended drawings illustrate only typical embodiments of this invention and are not to be considered limiting of its scope, for the invention may admit to other equally effective embodiments.

DETAILED DESCRIPTION OF THE PREFERRED EMBODIMENTS

Figure 1:
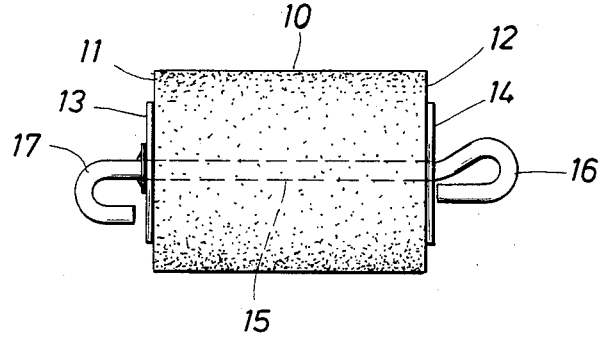
FIG. 1 is a sectional view through a birdie of the prior art showing details of construction thereof.

Attention is first directed to FIG. 1 of the drawings. There, a prior art birdie is illustrated at sectional view. The birdie utilizes an open cell foam body of cylindrical construction which is identified by the numeral 10. It has end faces 11 and 12. The end faces support washers 13 and 14. The washers are perforated at the center. They preferably have a diameter which is slightly less then the diameter of the open cell foam body 10. The washers are formed of a resilient material to flex slightly. A metal wire 15 extends fully through the body 10. It can slide slightly. Movement is limited by loops 16 and 17 at opposite ends. The loops are folded over to assure that the end washers are contacted, thereby shifting the axial load from the optical fiber leader tied to an end loop onto the birdie.

In operation, the prior art device is forced by air pressure through the plastic pipe as will be described. As further stated, it has a range that is perhaps 1000 ft., although on some occasions 1800 ft. has been reported.

Figure 2:
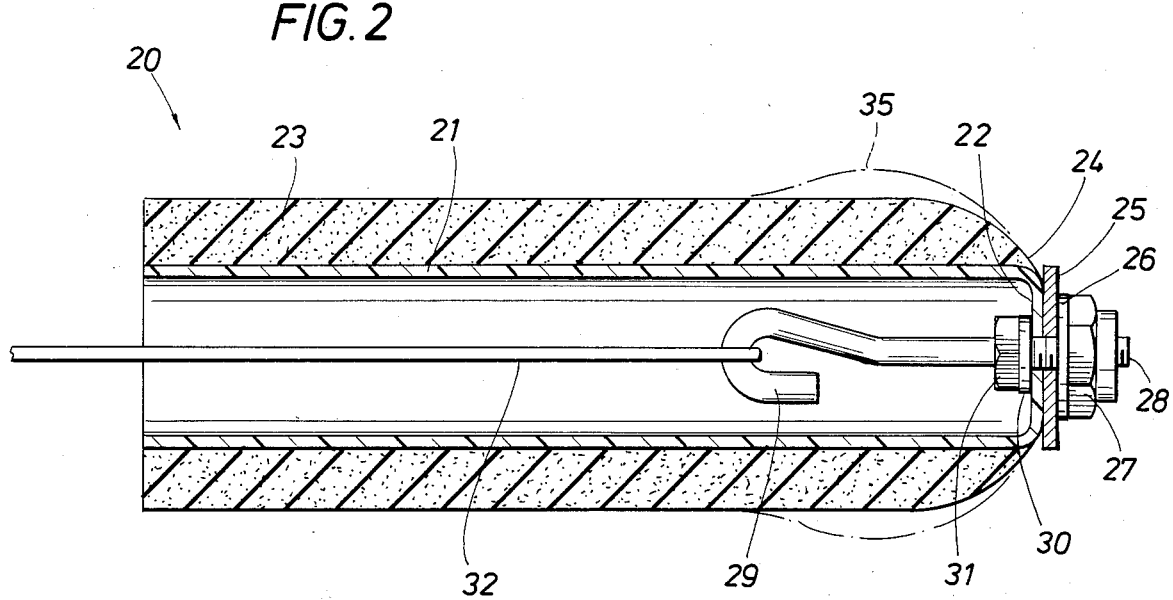
FIG. 2 is a sectional view through an optical fiber leader towing pig of the present disclosure particularly illustrating the construction of the nose wherein the optical fiber leader is connected behind the nose and representing in dotted line expansion of the pig with increasing load at the nose.

The present apparatus is better shown and described in reference to FIG. 2 of the drawings. There, the optical fiber leader towing pig is identified generally by the numeral 20. Preceeding with description of the pig body first, it is constructed with an elongate sleeve-like layer of resilient material identified at 21. It is elongate and hollow. It closes over at the nose with the nose portion 22. The material is impervious, i.e., it is not made of open cell plastic material. Since, it is closed cell, it sustains a pressure differential across the wall of the impervious layer 21. On the exterior, a foam layer of open cell plastic material is illustrated. It is identified by the numeral 23. Preferably it terminates in a streamline nose portion at 24. The measure of streamlining can be varied, keeping in mind that the birdie shown in FIG. 1 has a diameter of about 1 inch, while the pig 20 has a diameter typically conforming to the plastic pipe. Plastic pipe appears to be available in accordance within industry standards in 3 or 4 sizes which range up to about 4 inches i.d. Hence, the diameter of the foam layer 23 is sized so that it fits slightly in contact with the wall of the pipe. Thus, if the plastic pipe has an inner diameter of 1.5 inches, the pig 20 has a nominal outer diameter of about 1.49 inches. Keeping in mind that the outer layer 23 is a relatively soft open cell construction, the manufacturing tolerance of perhaps 0.02 inches is certainly acceptable. If it is oversized, there is blow-by path through the open cell foam construction. Also, there is a typical blow-by path on the exterior. The layer 23 cannot be too stiff or rigid, and foam and density between about 4 and about 10 pounds per cubic feet is sufficiently pliable and yet has durability to successfully operate.

The forward end of the pig 20 includes a support structure. A rigid metal washer 25 is adhesively anchored in the impervious layer 21 across the nose portion 22. It is drilled with a center hole and receives a flat washer 26. The washer 26 is a lock washer of the typical split ring variety. A nut 27 is threaded onto a threaded stem 28. The stem 28 is fairly long and terminates in a hook or eyelet 29. This is located on the interior of the pig body, the pig body being a substantially hollow open sleeve enabling access from the back end of the pig. Again, a suitable washer 30 cooperative with a nut 31 locks the eyelet at a central location within the pig body.

In the construction as described at this point, it will be observed that the nose of the pig serves as a support or anchor for the optical fiber leader 32 which is towed behind the pig 20. The leader 32 (in accordance with industry standards) today is exemplified by a prelubricated leader known as Muletape ®, a product presently sold by a Neptco of Pawtucket, R.I. This is a relatively strong tape which is fabricated with a lubricant impregnated into the tape to reduce drag. Moreover, it is marked with footage marks to enable easy determination of the penetration of the leader into a plastic pipe during installation of an optical fiber. The leader 32 is tied to or anchored on the eyelet 29 and is pulled behind the pig 20 as it traverses the plastic pipe.

The amount of blow-by and the passage provided for blow-by is important for operation of this device. Assume for purposes of description that 100 psi air is introduced behind the pig 20 to force it through a plastic pipe. If the pig 20 were not towing anything, its range of travel would be substantially without limit. In fact, it would only be limited by frictional losses in the air flow introduced by a pump or compressor at the end of the plastic pipe.

Continuing with the description of the towing pig 20, the dotted line at 35 shows a swelling which occurs in operation. At the stage where the pig first enters the plastic pipe, the frictional drag of the leader 32 behind the pig is substantially nil. This drag however increases more or less in linear fashion with penetration of the pig into the plastic pipe. Thus, when it has traversed 1000 ft., the drag force is approximately 10 times greater than the drag force on towing the leader only through 100 ft. of plastic pipe. With this ten fold increase, the load resulting from the towed leader impacts the nose portion of the pig. That is, the towed leader pulls on the eyelet 29 which in turn reshapes the nose portion. This causes swelling at the nose as a result of the distortion which occurs on loading. The bulge 35 is thus formed and swells the diameter as it is enlarged at the nose portion of the pig body, the amount of blow-by in the annular gap between the pig 20 and the surrounding plastic pipe is controllably reduced. Not only is it reduced, it is reduced in a controllable fashion. As it is reduced as a function of frictional drag acting on the pig from the towed leader, the amount of blow-by is reduced and hence, the thrust acting on the pig is increased. At the time the pig is first introduced in the plastic pipe, the thrust on it is limited by blow-by. This thrust increases with swelling of the pig body at 35 and the thrust in the forward direction increases more or less with the increase in the drag force acting on the pig. This then powers the pig to traverse a greater length. That is, its range of travel is increased. In a typical comparative situation, the birdie shown in FIG. 1 typically achieves about 1000 ft. and up to about 1800 ft. The pig 20 shown in FIG. 2 is able to travel 5000 ft. or greater in routine fashion. This particular advantage cuts down the interruptions necessary to extend an optical fiber great distances through plastic pipe.

Figure 3:
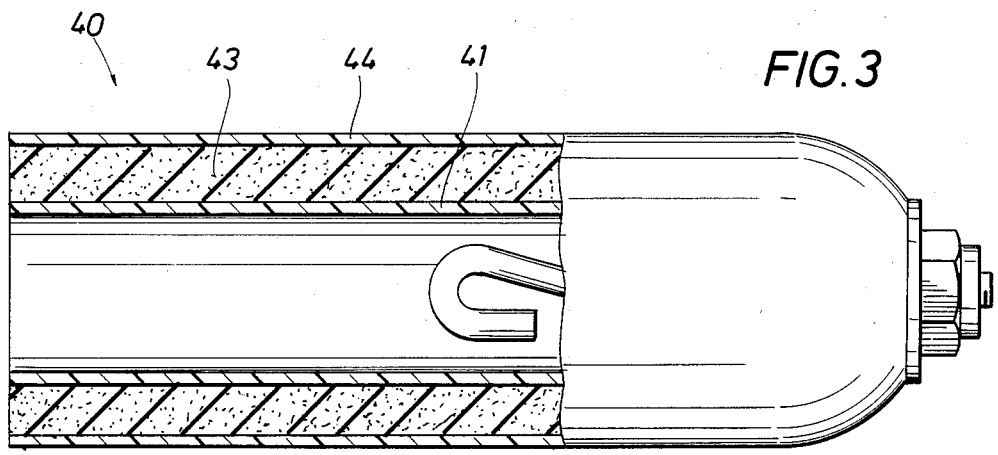
FIG. 3 is a view similar to FIG. 2 of a modified embodiment with a portion of the view in sectional view to illustrate the addition of an external layer on the pig body to reduce friction.
Figure 4:
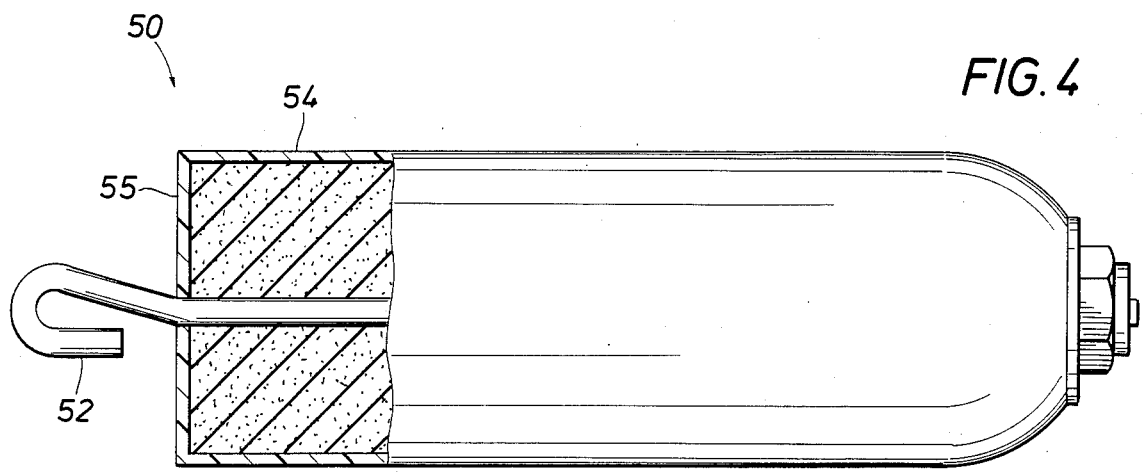
FIG. 4 is a view of another embodiment wherein the sectional view shows an outer layer on the body of the pig.
Figure 5:
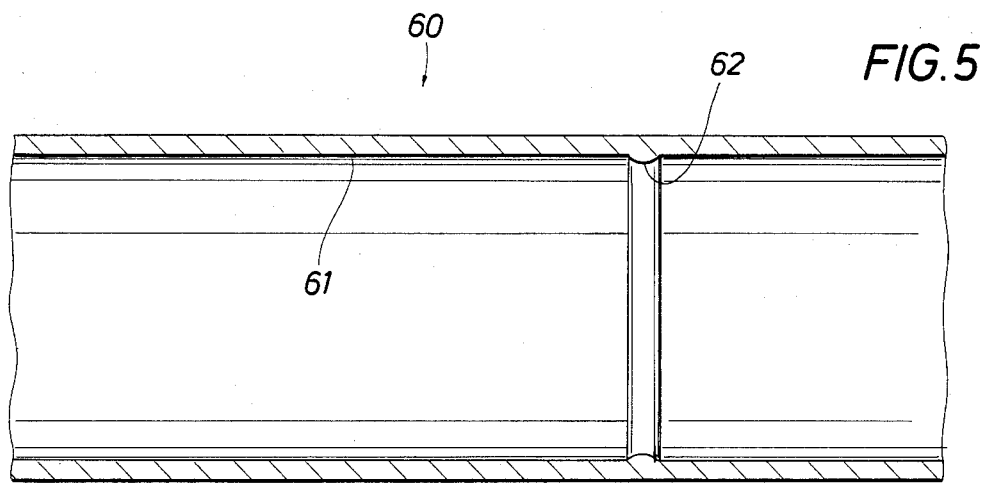
FIG. 5 is a sectional view through a welded plastic pipe which receives an installed optical fiber.
Figure 6:
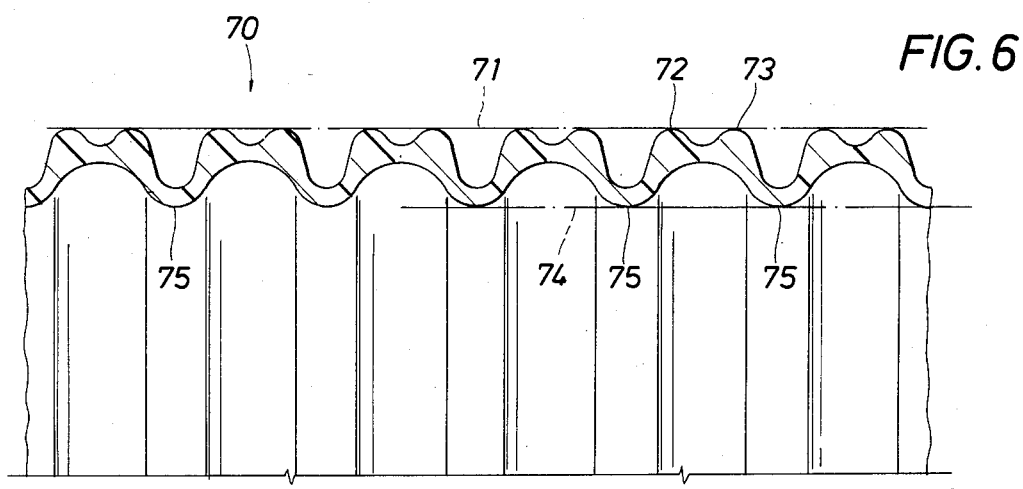
FIG. 6 is a sectional view through an alternative form of optical fiber receiving plastic pipe having a corrugated wall.

While FIGS. 5 and 6 set forth details of the plastic pipe, additional embodiments of the optical fiber towing pigs of this disclosure are also set forth in FIGS. 3 and 4. FIG. 3 shows a second embodiment pig identified generally by the numeral 40. It incorporates an impervious membrane 41 which corresponds to the layer 21 shown in FIG. 2. It also includes an open cell foam layer 43. There is an outer layer which is relatively thin and identified by the numeral 44. This layer is preferably impervious and is made of a low friction material. One example of a low friction material is plastic impregnated with graphite particles. Graphite is particularly slick. Alternatively, Teflon ® flakes embedded in or mixed with the layer 44 will also provide a relatively slick surface. This can reduce the coefficient of drag by several percent, thus improving the travel of the pig along the plastic pipe.

In other regards, the pig shown in FIG. 3 at 40 is identical in construction to the pig 20. Blow-by around the pig 40 is still permitted. One blow-by route however, is eliminated, namely the route through the foam layer 43. While it is preferably made of open cell construction to define a soft pig body, it is closed over by the outer layer 44 which is impervious. Even so, swelling at the nose is accomplished on loading of the pig body whereby blow-by is reduced and the pushing force behind the pig is increased.

The embodiment 50 shown in FIG. 4 is similar to the embodiment 40 except that the impervious layer 54 on the exterior is extended across the back face at 55. This impervious layer prevents intrusion of the propelling fluid (air in practically every case) into the pig. Thus, the pig then has a solid body and is not axially hollow. The eyelet 52 is then positioned to the rear. The pig 50 is used with a particular type of plastic pipe. The coaction between the pig 50 and the particular plastic pipe will be described in conjunction with the description of FIG. 5.

FIG. 5 is a sectional view through one form of plastic pipe. It has a smooth internal wall at 61. The plastic pipe 60 is extruded in elongate smooth wall sections which are butt welded. This produces an internal upset or bead 62. The bead intrudes on the interior. The pig 50 is ideal for a smooth wall plastic pipe 60. In operation, the eyelet 52 is loaded and produces a force acting at the nose of the pig also. However, swelling is limited significantly. The swelling of the pig body at the nose portion is substantially reduced, and hence, this substantially uniform cylindrical diameter on the pig body enables the pig body to pass the restricted diameter at the bead 62. The pig 50 finds ideal application in the plastic pipe 60 shown in FIG. 5. However, it typically requires manufacture with tighter tolerance control so that the amount of blow-by is initially properly set and is not so great that the pig will not traverse the plastic pipe 60.

Another popular form of plastic pipe is illustrated in FIG. 6 at the reference numeral 70. This is corrugated with transverse ripples. It has an outer diameter identified at the line 71. Each corrugation has duplicate top ridges at 72 and 73. They are in the form of circular beads which are adjacent to one another with a slight valley between the two. As shown in FIG. 6, they are arranged in adjacent pairs. There is an internal diameter at 74. This diameter is defined by the root 75. Only a single gently curving area is provided at each root. The radius of curvature at the root is greater than the relatively short radius for the ridges 72 and 73. The plastic pipe 70 of FIG. 6 thus has a minimal contact area only at the root 75. This is a relatively reduced surface area in contrast with the surface area at the diameter 74. In other words, the contact area against the traversing pig is reduced by perhaps 75% to 85%. This then reduces the drag encountered by the traversing pig. Moreover, there is a rounding so that the pig (on approach against each root) is gently engaged and does not snag on a sharp corner. The pigs 20 and 40 are ideal for use in the plastic pipe 70. That is, pigs 20 and 40 are preferably not used with the plastic pipe 60. Consider the towing 20 which swells near the nose portion at 35. This measure of expansion is sufficient to snag the towing on the internal upset bead 62 shown in FIG. 5. By contrast, the plastic pipe 70 is cooperative with the swelling at 35. This enables the towing 20 to thus swell or expand near the nose portion, reducing blow-by and yet the towing is still forced along the plastic pipe 70 riding on the roots 75 that contact the pig. For instance, if the towing contacts 6 or 7 roots, as it travels the blow-by is slowly reduced as the leader drag is increased and the enlarged nose 35 smoothly eases through the next root. It should be kept in mind that the nominal inner diameter at 74 of the plastic pipe 70 is slighly larger then the nominal outer diamter of the pig 20. After swelling, there is an interferance fit in comparing these two measures but the interferance is not the type of interference encountered in fitting metal components together. Rather, the swelling at 35, while larger, nevertheless can be squeezed as each consecutive root is encountered.

It is believed that the various embodiments of the present apparatus and the method of operation thereof have been set forth in detail in this disclosure. While the foregoing sets forth preferred forms of construction, the scope of the present disclosure is determined by the claims which follow.

What is claimed is:

1. A method of installing an optical fiber leader in a plastic pipe comprising the steps of:
   (a) for a length of plastic pipe, placing a leader towing pig in the pipe;
   (b) connecting the towed leader to the nose portion of the pig to load the pig body, causing an enlargement of the nose portion pig diameter;
   (c) forcing a propellent fluid into the plastic pipe to force the pig along the plastic pipe;
   (d) defining a controllable blow-by relative to the pig;
   (e) towing behind the pig an optical fiber leader of indefinite length wherein pig travel along the plastic pipe increases the length of the towed member therebehind in the plastic pipe; and
   (f) reducing the blow-by to increase the thrust force acting on the pig to compel the pig along the plastic pipe as the drag force from the towed member increases with length of pipe traversed.

2. The method of claim 1 including the step of forming an external surface layer on the pig body with a material of reduced surface friction.

3. The method of claim 1 including the step of reshaping the nose portion of the pig as a function of optical fiber leader loading on the pig.

4. The method of claim 3 including the step of anchoring one end of the towed optical fiber leader to an eyelet, and including further the step of connecting the eyelet to the nose portion to reshape the nose portion.

5. The method of claim 1 including the step of towing an elongate optical fiber leader from connector means on the pig, and reducing frictional drag of the optical fiber leader by coating the optical fiber leader with friction reducing material.

6. The method of claim 5 including the step of placing lengthwise marks on the optical fiber leader to enable determination of the travel of the pig into the plastic pipe.

7. The method of claim 1 including the step of defining pig body length as a hollow impervious first resilient layer having a closed nose portion, and forming thereover an outer layer of open cell foam to enable propellant fluid to flow therethrough.

8. The method of claim 7 including the further step of defining a closed nose portion on the pig body, and selectively placing a deforming force on the nose portion of the pig body to cause controllable diametric expansion.

9. The method of claim 8 including the step of positioning nose flattening washer over the nose and pulling on the washer to enlarge the nose portion to response to pulling.

10. The method of claim 1 including the step of positioning the pig body in a plastic pipe, forming regular spaced transverse corrugations in the plastic pipe, and shaping the pig body to enable the pig body to slidingly engage transverse corrugations of the pipe, and further including the step of swelling the nose portions of the pig body to an interference fit past pipe corrugations to reduce blow-by.

11. The method of claim 10 including the step of forming the nose portion of foam plastic to enable nose portion deformation.

12. The method of claim 11 including the step of swelling the nose portion with the drag of the towed member.

13. The method of claim 12 including the step of connecting the towed member to the nose portion through an eyelet connector anchored to the nose portion.

14. The apparatus for extending an optical fiber leader along a plastic pipe, comprising:
   (a) an elongate pig body of resilient material;
   (b) a leading nose portion of streamlined shape to enable entry into a plastic pipe;
   (c) optical fiber leader connector means supported by said pig body, said connector means being accessible from the rear of said pig body to enable connection of a towed optical fiber leader therebehind;
   (d) elongate mounting means connected to said connector means and extending to the nose portion of said pig body;
   (e) an outer surface of elongate cylindrical construction adapted to slidably travel along a plastic pipe.

15. The apparatus of claim 14 including nose located transverse rigid means anchoring said mounting means to said pig body to cause nose expansion on loading said connector means.

16. The apparatus of claim 14 including an elongate axially hollow, tubular member comprising said pig body, said tubular member being formed of impervious, resilient plastic material terminating at a forward nose portion.

17. The apparatus of claim 16 including an external open cell resilient plastic layer about said pig body defining an open cell blow-by path through said layer.

18. The apparatus of claim 16 including an externally exposed outer layer of resilient material having graphite or Teflon therein to reduce friction.

19. The apparatus of claim 18 wherein said pig body includes an elongate cylindrical body closed over at the rear end thereof by an impervious covering.

20. The apparatus of claim 14 including;
   (a) a transverse, nose mounted, rigid member;
   (b) an elongate, axially positioned, rearwardly extending mounting means connected to said rigid member;
   (c) said mounting means supporting said connector means; and
   (d) said pig nose portion and said rigid member defining a transverse, impervious nose portion blocking fluid flow therethrough.

21. The apparatus of claim 20 including a longitudinal opening, axially extending along said pig body and terminating behind the nose portion to introduce pipe fluid behind said nose portion, and wherein said mounting means extends along the opening axially behind said nose portion.

22. The apparatus of claim 21 wherein said connector means comprises an eyelet supported on an elongate stem connector means.

23. The apparatus of claim 22 wherein said eyelet is encircled by said pig body.

24. The apparatus of claim 23 wherein said pig body is an axially hollow, multilayer sleeve shaped cylinder around said eyelet.

25. The apparatus of claim 14 wherein said pig body is formed of an internal cylindrical impervious member having an open cell foam layer there around with a density of less than about 10 pounds per cubic foot.

* * * * *